United States Patent
Zimmanck et al.

(10) Patent No.: US 11,398,731 B2
(45) Date of Patent: Jul. 26, 2022

(54) METHOD AND APPARATUS FOR BALANCING LOADS ON SPLIT-PHASE ISLANDED SYSTEMS

(71) Applicant: Enphase Energy, Inc., Petaluma, CA (US)

(72) Inventors: Donald Richard Zimmanck, Sebastopol, CA (US); Raghuveer R. Belur, Los Altos Hills, CA (US); Martin Fornage, Petaluma, CA (US); Patrick L. Chapman, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 17/364,133

(22) Filed: Jun. 30, 2021

(65) Prior Publication Data

US 2021/0408791 A1    Dec. 30, 2021

Related U.S. Application Data

(60) Provisional application No. 63/046,674, filed on Jun. 30, 2020.

(51) Int. Cl.
*H02J 3/26* (2006.01)
*H02J 3/14* (2006.01)
*H02J 3/38* (2006.01)

(52) U.S. Cl.
CPC .............. *H02J 3/26* (2013.01); *H02J 3/144* (2020.01); *H02J 3/381* (2013.01); *H02J 3/388* (2020.01); *H02J 2310/60* (2020.01)

(58) Field of Classification Search
CPC ........ H02J 3/26; H02J 3/007; H02J 3/14–144; H02J 2310/60
See application file for complete search history.

(56) References Cited

U.S. PATENT DOCUMENTS

| 5,604,385 | A | * | 2/1997 | David | .............. | H02J 3/26 307/29 |
| 6,018,203 | A | * | 1/2000 | David | .............. | H02J 3/26 307/29 |

(Continued)

FOREIGN PATENT DOCUMENTS

| EP | 3379678 A1 | 9/2018 |
| JP | 5645864 B2 | 12/2014 |

OTHER PUBLICATIONS

PCT International Search Report and Written Opinion for Application No. PCT/US2021/039918 dated Oct. 25, 2021, 8 pgs.

*Primary Examiner* — Rexford N Barnie
*Assistant Examiner* — David A Shiao
(74) *Attorney, Agent, or Firm* — Moser Taboada

(57) ABSTRACT

A method and apparatus for balancing loads on a split-phase islanded system. In one embodiment, the apparatus comprises a device, coupled between a DG and a plurality of loads, comprising: an autotransformer coupled to first and second phase lines and a neutral line of the split-phase islanded system; a plurality of switches to switch between coupling a corresponding load to the first phase line and coupling the corresponding load to the second phase line; and a controller for determining, when a load imbalance is identified, at least one load to be switched from one of the first or second phase lines to the other of the first or second phase lines to reduce the load imbalance, and controlling at least one switch to switch the at least one load from the one of the first or second phase lines to the other of the first or second phase lines.

20 Claims, 5 Drawing Sheets

(56) References Cited

U.S. PATENT DOCUMENTS

| | | | |
|---|---|---|---|
| 9,166,410 B1* | 10/2015 | Kim | H02J 3/26 |
| 10,008,854 B2 | 6/2018 | Zimmanck | |
| 10,757,830 B1* | 8/2020 | Errato, Jr. | H05K 7/20545 |
| 2009/0085403 A1* | 4/2009 | Kim | H02J 3/26 |
| | | | 307/38 |
| 2011/0102958 A1* | 5/2011 | Meehleder | H02H 1/06 |
| | | | 361/93.1 |
| 2012/0175951 A1* | 7/2012 | Pamulaparthy | H02J 3/26 |
| | | | 307/11 |
| 2014/0203646 A1* | 7/2014 | Belur | H02J 3/26 |
| | | | 307/52 |
| 2014/0268947 A1* | 9/2014 | Phadke | H02J 1/102 |
| | | | 363/69 |
| 2019/0140556 A1 | 5/2019 | Dent | |
| 2019/0222023 A1* | 7/2019 | Sharifipour | H02J 13/0017 |
| 2020/0014206 A1 | 1/2020 | Haartsen et al. | |
| 2021/0083506 A1* | 3/2021 | Rao | G05F 1/10 |
| 2022/0131380 A1* | 4/2022 | Naesje | B60L 3/0046 |
| 2022/0149620 A1* | 5/2022 | Allert | H02J 3/388 |

\* cited by examiner

METHOD AND APPARATUS FOR BALANCING LOADS ON SPLIT-PHASE ISLANDED SYSTEMS

CROSS-REFERENCE TO RELATED APPLICATIONS

This application claims benefit of U.S. provisional patent application Ser. No. 63/046,674, entitled "Balancing Device for Neutral Current Reduction on Split-Phase Islanded Systems" and filed Jun. 30, 2020, which is herein incorporated in its entirety by reference.

BACKGROUND OF THE INVENTION

Field of the Invention

Embodiments of the present disclosure relate generally to split-phase islanded systems and, in particular, a balancing device for balancing neutral current in split-phase islanded systems.

Description of the Related Art

In the United States, the typical power setup in households is a 240/120 split-phase system consisting of two 120V power wires, LINE1 and LINE2 which are out of phase by 180 degrees, and a neutral line. For loads that use low power—such as the lights, television, stereo and computer peripherals—the power is supplied by either one of the two line-to-neutral 120V power circuits, while for loads that use high amounts of power—such as the washing machine, dishwasher, air conditioner and heaters—a line-to-line 240V power circuit is used.

Off-grid systems sometimes use single-phase inverters which typically only maintain a 240V bus LINE1-to-LINE2. Such systems either rely on a second split-phase inverter or a neutral-forming autotransformer (a passive magnetic device). These systems are bulky and costly since the size (and thus cost) of the neutral forming device is determined by the maximum neutral current that it must supply.

Therefore, there is a need in the art for a smaller and less expensive neutral forming device for balancing loads in split-phase islanded systems.

SUMMARY OF THE INVENTION

Embodiments of the present invention generally relate to a method and apparatus for balancing loads on a split-phase islanded system. substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for dynamically balancing loads to achieve neutral current reduction on split-phase islanded systems. In one or more embodiments, a balancing device, which may be part of a load panel, integrates SPDT (single-pole dual-throw) switches onto all load-side branch circuits (e.g., 120V branch circuits) allowing them to be switched between phase lines LINE1 and LINE2 on a split-phase electrical system (e.g., a 240/120V split-phase system). This allows the load distribution between the phase lines LINE1 and LINE2 to be more actively balanced thereby reducing the system neutral current.

Indicators of load balance on the phase lines of a split-phase system (e.g., measure current flow on one or more lines) are obtained and used to calculate any load imbalance. When it is determined that a sufficiently large load imbalance exists, one or more actions are determined to reduce or eliminate the imbalance, and the determined actions are then implemented. In various embodiments, one or more loads are switched from one phase line to the other phase line in order to reduce or eliminate the imbalance.

Figure 1:
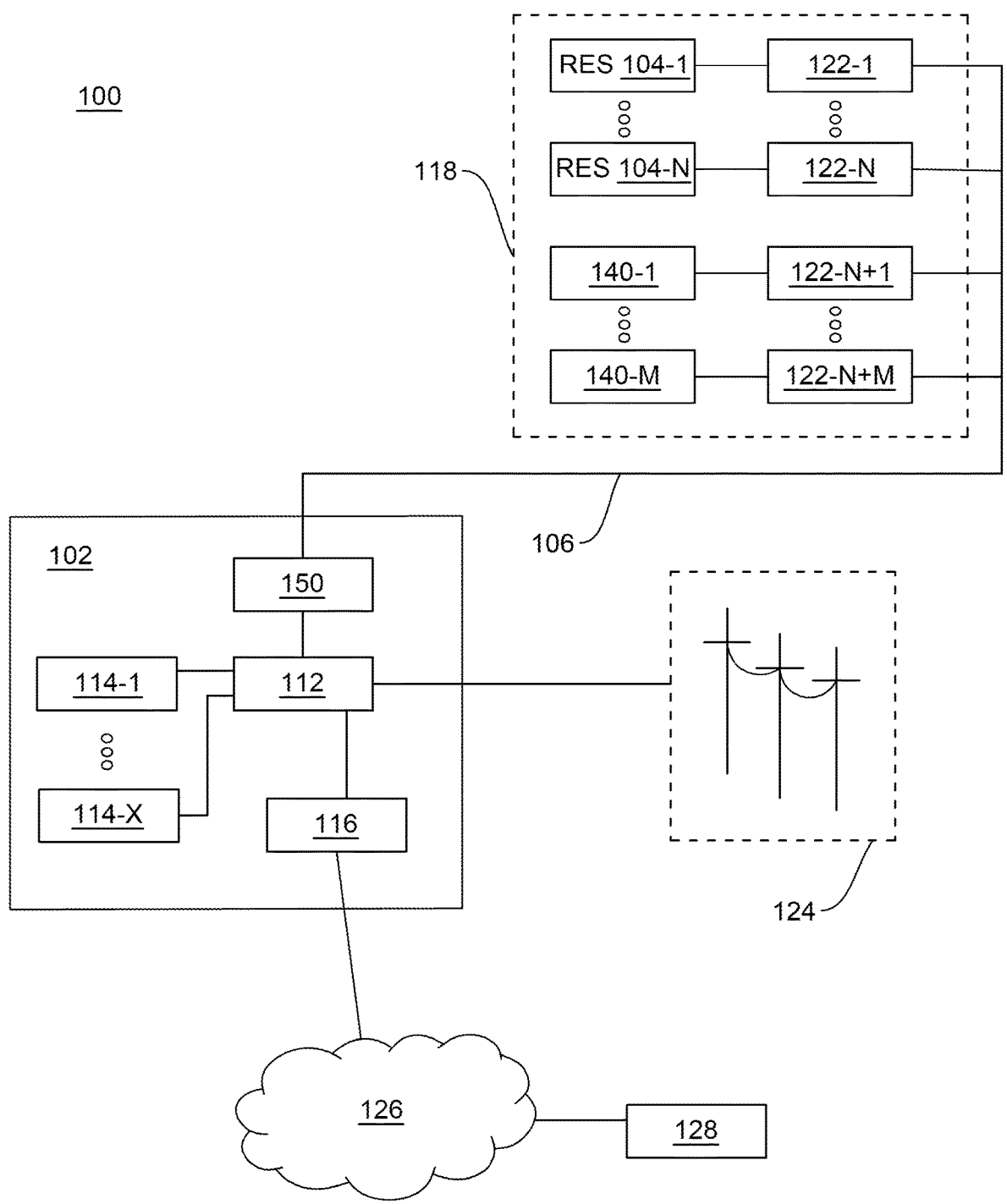
FIG. 1 is a block diagram of a system for power generation in accordance with one or more embodiments of the present invention.

FIG. 1 is a block diagram of a system 100 for power generation in accordance with one or more embodiments of the present invention. This diagram only portrays one variation of the myriad of possible system configurations. The present invention can function in a variety of environments and systems.

The system 100 comprises a building 102, such as a residential or commercial building, having an associated load center 112 that is coupled to a power grid 124, such as a commercial power grid, and coupled to a distributed generator (DG) 118 via a balancing device 150. The load center 112 is further coupled to a plurality of 120V appliances 114-1 . . . 114-X, which may be referred to as appliances 114, and a DG controller 116.

The DG system 118 comprises a plurality of renewable energy sources (RESs) 104-1 . . . 104-N (which may be referred to as RESs 104) coupled to a plurality of power conditioners 122-1 . . . 122-N (which may be referred to as power conditioners 122) in a one-to-one correspondence; in some other embodiments, one or more of the power conditioners 122 may be coupled to multiple RESs 104. In the embodiments described herein the RESs 104 are photovoltaic (PV) modules, although in other embodiments they may be any type of renewable energy source that provides DC power, such as wind, hydro, and the like. The power conditioners 122 are microinverters that convert the generated DC power to AC power that is commercial grid compliant and couple the AC power to a DG branch circuit 106. The generated AC power may be further coupled from the load center 112 to the appliances 114 and/or to the power grid 124.

The DG 118 further comprises a plurality of power conditioners 122-N+1 . . . 122-N+M coupled to a plurality of energy storage/delivery devices 140-1 . . . 140-M (which may be referred to as energy storage/delivery devices 140) in a one-to-one correspondence; in some other embodiments one or more of the power conditioners 122-N+1 . . . 122-N+M may be coupled to multiple energy storage/delivery devices 140. The power conditioners 122-N+1 . . . 122-N+M are bidirectional microinverters that convert DC power from the RESs 140 to AC power that is coupled to the DG branch circuit 106, and convert AC power (e.g., from the power grid 124) to DC power that is stored in the energy storage/delivery devices 140. The energy storage/delivery devices 140 may be any type of device that can store energy and provide the stored energy, such as a battery.

Each of the power conditioners 122 is a single-phase inverter which only maintains a 240V bus LINE1-to-LINE2. Although the embodiments described herein pertain to a 240/120 split phase system, other embodiments may pertain to systems having other voltages.

The DG 118 operates as a microgrid when the power grid 124 is unavailable; in alternative embodiments the power grid 124 is not coupled to the load center 112 at all and the DG 118 operates as an off-grid microgrid. In some other embodiments, additional RESs 104/power conditioners 122 and/or devices 140/power conditioners 122 may be coupled to one or more additional branch circuits that are each coupled to the load center 112 via corresponding balancing devices 150.

The DG controller 116 communicates with the power conditioners 122 using power line communications (PLC), although additionally or alternatively other types of wired and/or wireless techniques may be used. The DG controller 116 may provide operative control of the DG 118 and/or receive data or information from the DG 118. For example, the DG controller 116 may be a gateway that receives data (e.g., alarms, messages, operating data and the like) from the power conditioners 122 and communicates the data and/or other information to a remote device or system, such as a master controller 128 communicatively coupled to the DG controller 116 via a communications network 126 (e.g., the Internet). The DG controller 116 may also send control signals to the power conditioners 122, such as control signals generated by the DG controller 116 or sent to the DG controller 116 by the master controller 128. The DG controller 116 is wirelessly coupled to the communications network 126, e.g., via a commercially available router, although additionally or alternatively wired types of connectivity may be used. In certain embodiments, the master controller 128 may be cloud-based.

Figure 2:
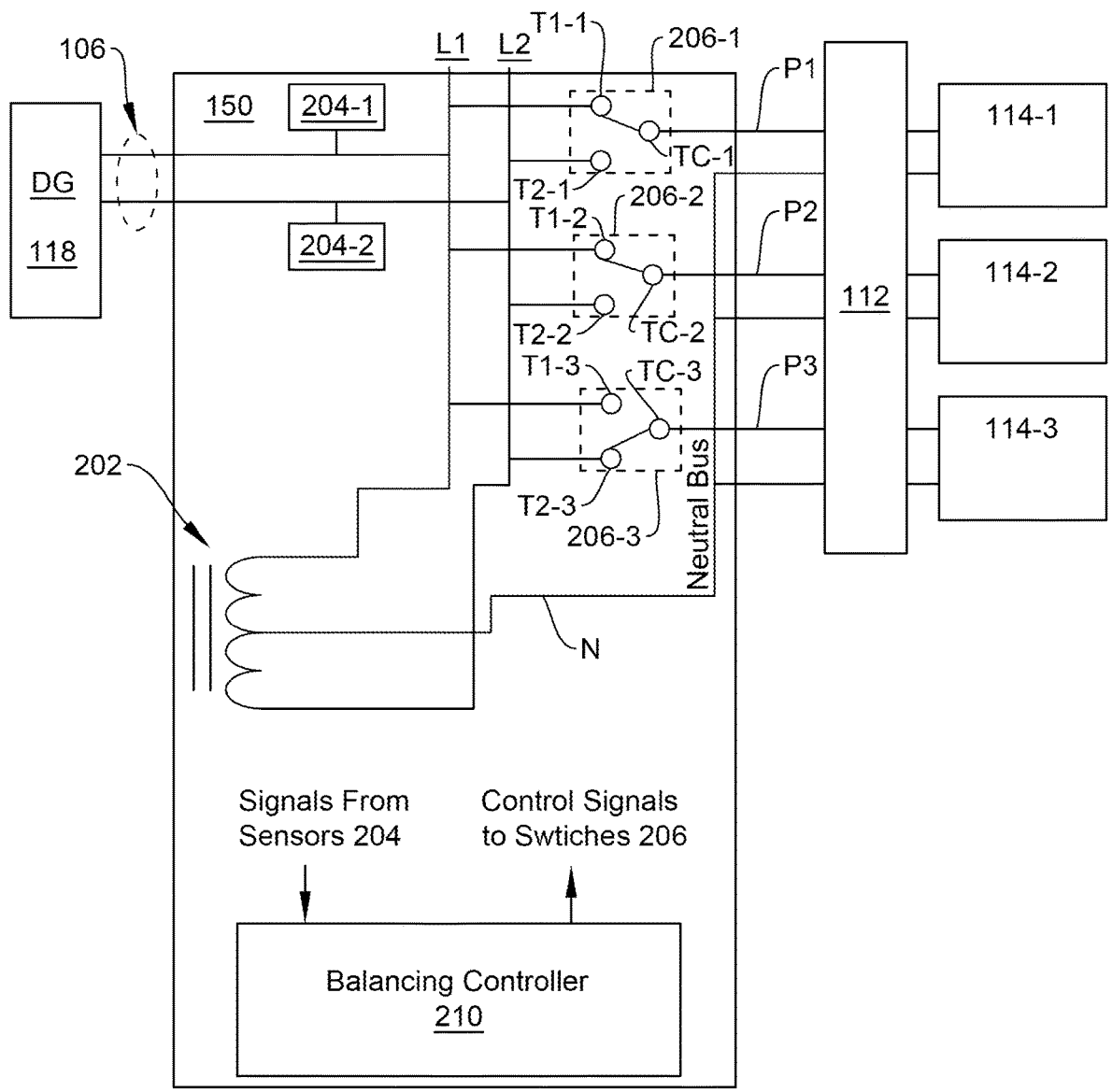
FIG. 2 is a block diagram of a balancing device in accordance with embodiments of the present invention.

In accordance with one or more embodiments of the present invention, the balancing device 150 comprises an autotransformer and integrates single-pole dual-throw (SPDT) switches onto all load-side branch circuits (e.g., 120V branch circuits) as described in detail with respect to FIG. 2. The balancing device 150 allows the individual load-side branch circuits to be dynamically switched between LINE1 and LINE2 on a split-phase electrical system. As such, the load distribution between LINE1 and LINE2 is more actively balanced, thereby reducing the system neutral current.

Although the balancing device 150 is depicted in FIG. 1 as being located outside of the load center 112, in other embodiments the balancing device 150 may be incorporated into the load center 112. In still other embodiments, the balancing device 150 may be part of the DG 118.

FIG. 2 is a block diagram of a balancing device 150 in accordance with embodiments of the present invention. As depicted in FIG. 2, the balancing device 150 is coupled to phase lines L1 and L2 (e.g., via the load center 112) and is further coupled, via the load center 112, to loads 114-1 (e.g., a toaster), 114-2 (e.g., a microwave oven), and 114-3 (e.g., a refrigerator/freezer). A first AC power line P1 and a neutral bus N are coupled from the balancing device 150 to the load 114-1, a second AC power line P2 and the neutral bus N are coupled from the balancing device 150 to the load 114-2, and a third AC power line P3 and the neutral bus N are coupled from the balancing device 150 to the load 114-3. Although three loads 114 are depicted in FIG. 2, any number of loads 114 may be coupled to the lines L1 and L2 and controlled by the balancing device 150 as described herein.

The balancing device 150 comprises an autotransformer 202, a neutral bus N, and a plurality of single-pole dual-throw (SPDT) switches 206-1, 206-2, and 206-3 (collectively referred to as switches 206) for coupling each of the loads 114-1, 114-2, and 114-3 individually to the phase line L1 or the phase line L2. The autotransformer 202 has a first terminal coupled to the phase line L1 and a second terminal coupled to the phase line L2 of the power grid 124; the phase lines L1 and L2 are also coupled to the DG 118 (i.e., via the branch circuit 106). The neutral bus N is coupled to the midpoint of the autotransformer 202.

The phase line L1 is further coupled to a first terminal of each of the switches 206-1, 206-2, and 206-3; the phase line L2 is further coupled to a second terminal of each of the switches 206-1, 206-2, and 206-3. Common terminals TC-1, TC-2, and TC-3 of the respective switches 206-1, 206-2, and 206-3 are coupled to corresponding loads 114-1, 114-2, and 114-3 via AC lines P1, P2, and P3, respectively.

Sensors 204-1 and 204-2 (collectively referred to as sensors 204) are coupled to the phase lines L1 and L2, respectively, for monitoring one or more current, voltage, and power (real and/or reactive). The sensors 204 may be any suitable device (transformers, shunts, dividers, and the like) that measures the desired entity and generates signals indicative of the measured values. In certain embodiments, the sensors 204-1 and 204-2 may be transducers, such as current transformers, that measure current levels on the lines L1 and L2, respectively.

In some embodiments, one or more additional sensors 204 may be coupled to or be part of the balancing device 150, such as on one or more of the load-side branch circuits coupled to the loads 114.

The balancing device 150 may further comprise a balancing controller 210 for operably controlling the balancing device 150 as described in detail below with response to FIG. 3. In some embodiments, one or more of the functions performed by the balancing controller 210 may be performed by one or more other components of the system 100, such as the controller 116 and/or the master controller 128.

The balancing controller 210 may be communicatively coupled to the sensors 204 for receiving sensed signals for use in evaluating load balance, overall loading, and the like. The balancing controller 210 may be communicatively coupled to the sensors 204 by any suitable wired and/or wireless technique; for example, in some embodiments the balancing controller 210 may be coupled to the lines L1 and L2 and communicates with the sensors 204 using power line communications (PLC).

The balancing controller 210 may further be communicatively coupled to the switches 206-1, 206-2, and 206-3, for individually controlling each of these switches (i.e., for providing control signals to each of the switches 206-1, 206-2, and 206-3). When the power grid 124 is not coupled to the load center 112 (i.e., when the building 102 is off-grid), the autotransformer 202 of the balancing device 150 sources all of the neutral current for the system. Generally, the loads 114 are split between the phase lines L1 and L2, and as such the neutral current when off-grid will be small. However, if one of the phase lines L1 or L2 has a larger number of loads 114 that are on at a given time compared to the other phase line, or if one of the phase lines L1 or L2 has a load 114 that draws a very large amount of current, one or more of the loads 114 can be dynamically switched between the phase lines L1 and L2 to actively balance the neutral current so that it remains as close to zero as possible.

The autotransformer 202 may be sized for the largest individual load 114 (e.g., the largest 120V load) in the system. In some embodiments, the autotransformer 202 may be on the order of a 2 kW or 2 kVA autotransformer.

Figure 3:
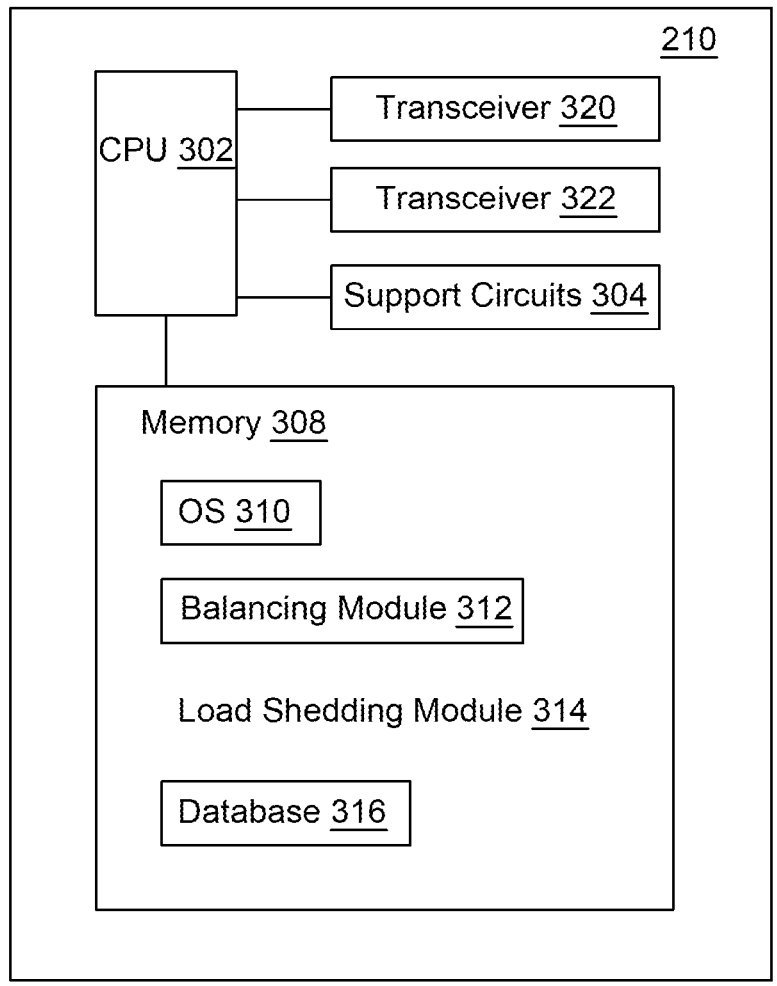
FIG. 3 is a block diagram of a balancing controller in accordance with embodiments of the present invention.

FIG. 3 is a block diagram of the balancing controller 210 in accordance with embodiments of the present invention. The balancing controller 210 (which may be referred to herein as "controller 210") comprises a central processing unit (CPU) 302 coupled to each of support circuits 304, transceivers 320 and 322, and memory 308. The CPU 302 comprises one or more processors including, but not limited to, one or more of an application specific integrated circuit, microprocessor, microcontroller, and the like. The support circuits 304 comprises circuits and devices that support the functionality of the CPU 302 and include, but not limited to, one or more of clock circuits, analog to digital converters, cache, power supplies, and the like. In one embodiment, the support circuits 304 comprise a monitoring circuit configured to digitize monitoring signals from the sensors 204 to generate digitized signals representing the values sensed by the sensors 204. The support circuit 304 may further comprise one or more circuits for manipulating monitoring signals received from the sensors 204, such as converting sensed current values to RMS values.

The transceiver 320 is communicatively coupled to the sensors 204 for communicating with the sensors 204, e.g., for receiving monitoring signals from the sensors 204 such as sensed current values, sensed voltage values, and/or sensed power values. The transceiver 320 may be coupled to the sensors 204 for communicating by any suitable wired and/or wireless technique, such as PLC, Zigbee, and the like.

The transceiver 322 is communicatively coupled to the switches 206-1, 206-2, and 206-3 for communicating with the switches, e.g., for transmitting control signals to the switches 206-1, 206-2, and 206-3 for individually controlling the switches 206-1, 206-2, and 206-3. The transceiver 322 may be coupled to the switches 206-1, 206-2, and 206-3 for communicating by any suitable wired and/or wireless technique, such as PLC, Zigbee, and the like.

The memory 308 is one or more non-transitory storage media comprising read only memory, random access memory, or a combination thereof for storing software and data. In one embodiment, the software comprises an operating system (OS) 310, a balancing module 312, and an optional load shedding module 314; additionally, the memory 308 may store a database 316 for storing various data (e.g., one or more thresholds, such as imbalance thresholds; a load profile, for each of the loads 114, comprising information about the load such as one or more of type of load, full-load current for the load (i.e., the maximum current that the load can draw), load configuration, and the like). The OS 310 facilitates functionality of the CPU 302 and comprises, for example, WINDOWS, LINUX, macOS, and the like. In some embodiments, the CPU 302 may comprise a microcontroller that does not rely on an operating system. In such a case, the memory 308 may not store an operating system 310.

In accordance with embodiments of the present invention, the balancing module 312, when executed, evaluates the loading on each of the lines L1 and L2 based on the digitized monitoring signals from the sensors 204, determines whether any balancing of the loading on the lines L1 and L2, determines any suitable load distribution on the lines L1 and L2 to achieve desired load balancing, and generates control signals for the switches 206-1, 206-2, and 206-3 to change the connectivity of the loads 114 to the phase lines L1 and L2 as needed. In some alternative embodiments, the balancing module 312 may be part of a different component of the system 100 rather than the balancing device 150, for example the controller 116 or the master controller 128.

In some embodiments, the balancing device 150 may be part of the load center 112 (e.g., as part of a smart load panel), or part of a smart switch that connects and manages connections between various components of the system 100. In certain embodiments, the balancing device 150 may comprise a microgrid interconnection device (MID) that automatically detects and seamlessly transitions a home energy system from grid power to backup power in the event of a grid failure.

Additionally, in one or more embodiments, the balancing device 150 comprises the optional load shedding module 314 for monitoring each load-side branch circuit and turn one or more off as needed, for example, for load shedding. As such, the balancing device 150 can both balance the phases and also load shed for demand response.

Figure 4:
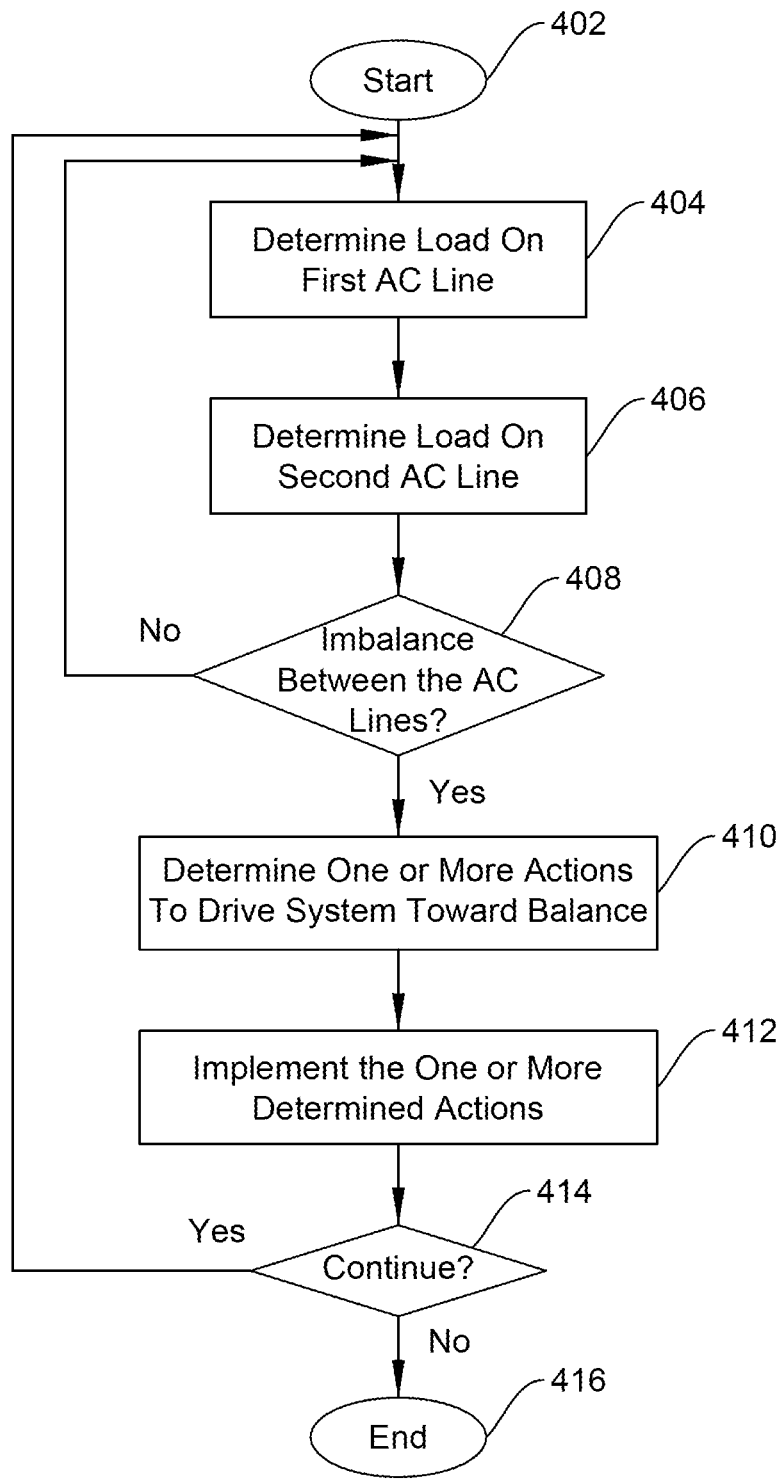
FIG. 4 is a flow diagram of a method for balancing loads among phase lines in a split-phase system in accordance with embodiments of the present invention.

FIG. 4 is a flow diagram of a method 400 for balancing loads among phase lines in a split-phase system in accordance with embodiments of the present invention. Any block, step, module, or otherwise described below may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module. Of course, such blocks are presented for illustration purposes only and any one or more block, step, or module may be combined with any other, removed, split, or moved between the various systems and subsystems illustrated.

In some embodiments, the method 400 is an implementation of the balancing module 312 described above. In some alternative embodiments, a computer readable medium comprises a program that, when executed by a processor, performs the method 400 that is described in detail below.

The method 400 begins at step 402 and proceeds to step 404. At step 404, a loading indicator for a first phase line (e.g., the phase line L1) of a split-phase system is determined. The line-side loading indicator may be determined based on signals received from a sensor coupled to the first phase line, such as the sensor 204-1; for example, the line-side loading indicator may be based on one or more of measured current, voltage, or power on the first phase line.

In various embodiments, the amount of current measured on the first phase line is used as the corresponding loading indicator.

In some alternative embodiments, sensors coupled to each load-side branch circuit off of the first phase line may provide signals indicative of the loading on the corresponding load-side branch circuit (e.g., one or more of the current, voltage, or power) which are then used to calculate a loading indicator for the first phase line.

The method 400 proceeds to step 406, where a line-side loading indicator for a second phase line (e.g., the phase line L2) of the split-phase system is determined. The line-side loading indicator may be determined based on signals received from a sensor coupled to the second phase line, such as the sensor 204-2; for example, the line-side loading indicator may be based on one or more of measured current, voltage, or power on the second phase line.

In some alternative embodiments, sensors coupled to each load-side branch circuit off of the second phase line may provide signals indicative of the loading on the corresponding load-side branch circuit (e.g., one or more of the current, voltage, or power) which are then used to calculate a loading indicator for the second phase line. In various embodiments, the amount of current measured on the second phase line is used as the corresponding loading indicator.

The method 400 proceeds to step 408, where a determination is made whether a load imbalance exists between the first and second phase lines. In order to determine whether a load imbalance exists, the loading indicators for the first and second phase lines are compared to one another. If the difference between the loading indicators does not exceed a threshold (which may be referred to as an imbalance threshold), the result of the determination is no, that an imbalance does not exist, and the method 400 returns to step 404. If, at step 408, the difference between the loading indicators exceeds the imbalance threshold, the result of the determination is yes, that an imbalance exists (i.e., an imbalance is identified). The method 400 then proceeds to step 410. The threshold may be predetermined based on, for example, the number of loads in the system, the size of the loads in the system, and the like. Additionally, the threshold may be adjustable so that it can be modified as needed. In some embodiments, a threshold equal to or on the order of 30 A may be used.

At step 410, one or more actions to drive the system toward balance are determined. The one or more actions may be determined based on load-side loading indicators for one or more of the load-side branch circuits (e.g., one or more of measured current, voltage, and power on each load-branch circuit), load profiles for the loads on the split-phase system (e.g., type of load on each load-side branch circuit, full-load current for the load (i.e., the maximum current that the load can draw), configuration of the load, and the like), The one or more actions may be further determined to ensure that phase currents on each phase line remain within protection limits of their respective phases, for example the one or more actions may be determined such that they will not cause a breaker in the system to trip.

The one or more actions may include switching one or more loads from one phase line to the other phase line, for example by generating control instructions for switching one or more of the switches 206.

The method 400 proceeds to step 412, where the one or more determined actions are implemented. In various embodiments, the one or more determined actions comprise switching one or more loads from one phase line to the other, and control signals are sent to the appropriate switches (e.g., the switches 206) to shift the one or more loads onto the other phase line. The control signals may be communicated to the switches by any suitable wired and/or wireless technique (e.g., PLC, Zigbee, or the like).

The method 400 proceeds to step 414, where a determination is made whether to continue. If the result of the determination is yes, the method 400 returns to step 404. If the result of the determination is no, the method 400 proceeds to step 416 where it ends.

In some alternative embodiments, an imbalance in the loading on the phase lines may be determined using a technique other than comparing the line-side loading indicators as described above. In certain alternative embodiments, the neutral line of the split-phase system (e.g., the neutral bus N of the balancing device 150) may be monitored for one or more neutral-line loading indicators which indicate a load imbalance, such as one or more of current, voltage, or power (e.g., using a sensor, such as a sensor 204, coupled to the neutral line). The one or more neutral-line loading indicators may then be evaluated to determine whether a load imbalance exists. For example, a neutral-line loading indicator, such as the amount of current measured on the neutral line, may be compared to an imbalance threshold; if the neutral-line loading indicator exceeds the threshold, a load imbalance between the phase lines is determined to exist.

Figure 5:
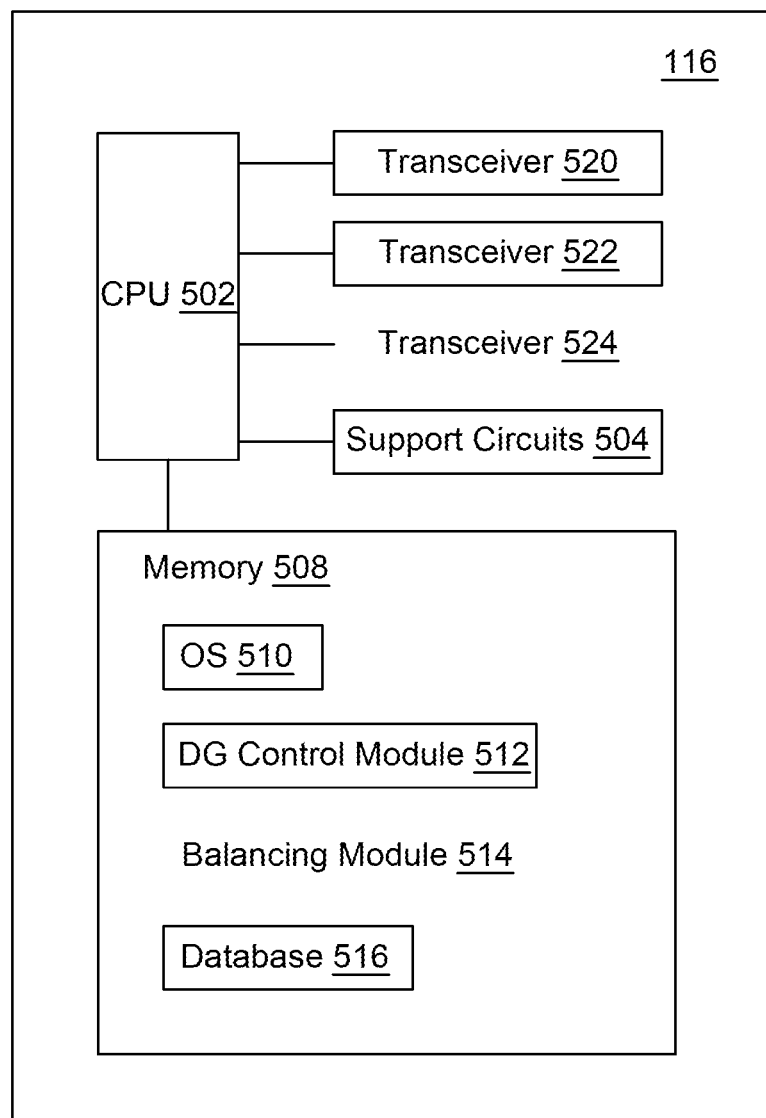
FIG. 5 is a block diagram of the distributed generator (DG) controller in accordance with embodiments of the present invention.

FIG. 5 is a block diagram of the DG controller 116 in accordance with embodiments of the present invention. The DG controller 116 (which may be referred to herein as "controller 116") comprises a central processing unit (CPU) 502 coupled to each of support circuits 504, transceivers 520 and 522, and memory 508. The CPU 502 comprises one or more processors including, but not limited to, one or more of an application specific integrated circuit, microprocessor, microcontroller, and the like. The support circuits 504 comprises circuits and devices that support the functionality of the CPU 502 and include, but not limited to, one or more of clock circuits, analog to digital converters, cache, power supplies, and the like.

The transceiver 520 is communicatively coupled to the DG 118 for communicating with one or more components of the DG 118, e.g., receiving data from the power conditioners 122, sending control signals to the power conditioners 122, and the like. The transceiver 520 may be communicatively coupled to the DG 118 for communicating by any suitable wired and/or wireless technique, such as PLC, Zigbee, and the like.

The transceiver 522 is communicatively coupled to the communications network 126, for example for communicating with the master controller 128 (e.g., for sending data regarding the system 100 to the master controller 128, for receiving control instructions from the master controller 128, and the like). The transceiver 522 may be communicatively coupled to the communications network 126 by any suitable wired and/or wireless technique.

In some alternative embodiments, the controller 116 comprises an optional transceiver 524 for communicating with the balancing device 150, e.g., for transmitting control signals to the switches 206-1, 206-2, and 206-3 for individually controlling the switches 206-1, 206-2, and 206-3. The transceiver 524 may be coupled to the balancing device 150 for communicating by any suitable wired and/or wireless technique, such as PLC, Zigbee, and the like, The memory 508 is one or more non-transitory storage media comprising read only memory, random access memory, or a combination thereof for storing software and data. In one embodiment, the software comprises an operating system (OS) 510, a DG control module 512; additionally, the memory 508 may store a database 516 for storing various data (e.g., one or more thresholds, such as imbalance thresholds; a load profile, for each of the loads 114, comprising information about the load such as one or more of type of load, full-load current for the load (i.e., the maximum current that the load can draw), load configuration, and the like). The OS 510 facilitates functionality of the CPU 502 and comprises, for example, WINDOWS, LINUX, macOS, and the like. In some embodiments, the CPU 502 may comprise a microcontroller that does not rely on an operating system. In such a case, the memory 508 may not store an operating system 510.

In some alternative embodiments, the memory 508 may further store an optional balancing module 514 for performing one or more of the functions previously described with respect to the balancing module 150.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for balancing loads on a split-phase islanded system, comprising:
 a balancing device, coupled between a distributed generator (DG) and a plurality of loads, comprising:
  an autotransformer having a first terminal coupled to a first phase line of the split-phase islanded system, a second terminal coupled to a second phase line of the split-phase islanded system, and a midpoint coupled to a neutral line, wherein the neutral line is coupled to each load of the plurality of loads;
  a plurality of switches, each switch of the plurality of switches operable to switch between coupling a corresponding load of the plurality of loads to the first phase line and coupling the corresponding load to the second phase line; and
  a controller for (i) determining, when a load imbalance between the first and the second phase lines is identified, at least one load of the plurality of loads to be switched from one of the first or the second phase lines to the other of the first or the second phase lines to reduce the load imbalance, and (ii) controlling at least one switch of the plurality of switches to switch the at least one load from the one of the first or the second phase lines to the other of the first or the second phase line.

2. The apparatus of claim 1, wherein each switch of the plurality of switches is a single-pole dual-throw switch.

3. The apparatus of claim 1, wherein the controller identifies the load imbalance based on measured current levels on the first and the second phase lines.

4. The apparatus of claim 3, wherein the controller identifies the load imbalance when a difference between the measured current levels on the first and the second phase lines exceeds a threshold.

5. The apparatus of claim 1, wherein the controller identifies the load imbalance based on measured current level on the neutral line.

6. The apparatus of claim 5, wherein the controller identifies the load imbalance when the measured current level on the neutral line exceeds a threshold.

7. The apparatus of claim 1, wherein the controller identifies the load imbalance based on measured current levels on each load-side branch circuit off of the first and the second phase lines.

8. The apparatus of claim 1, wherein the at least one load is determined based on a corresponding load profile for each load of the at least one load.

9. The apparatus of claim 8, wherein the at least one load is determined based on, for each load in the at least one load, full-load current specified in the corresponding load profile.

10. The apparatus of claim 1, wherein the at least one load is determined based on measured current levels for each load of the plurality of loads.

11. A method for balancing loads on a split-phase islanded system, comprising:

identifying a load imbalance between a first phase line of the split-phase islanded system and a second phase line of the split-phase islanded system, wherein (i) the first and the second phase lines are respectively coupled to a first terminal and a second terminal of an autotransformer of a balancing device, (ii) a midpoint of the autotransformer is coupled to a neutral line, that is coupled to each load of a plurality of loads, and (iii) each load of the plurality of loads is coupled by a corresponding switch of a plurality of switches to either the first or the second phase line, wherein each switch of the plurality of switches is operable to switch between coupling a corresponding load of the plurality of loads to the first phase line and coupling the corresponding load to the second phase line;

determining at least one load of the plurality of loads to be switched from one of the first or the second phase lines to the other of the first or the second phase lines to reduce the load imbalance; and controlling at least one switch of the plurality of switches to switch the at least one load from the one of the first or the second phase lines to the other of the first or the second phase line.

12. The method of claim 11, wherein each switch of the plurality of switches is a single-pole dual-throw switch.

13. The method of claim 11, further comprising identifying the load imbalance based on measured current levels on the first and the second phase lines.

14. The method of claim 13, further comprising:
determining a difference between the measured current levels on the first and the second phase lines;
comparing the difference to a threshold; and
determining, when the difference exceeds the threshold, that the load imbalance exists.

15. The method of claim 11, further comprising identifying the load imbalance based on measured current level on the neutral line.

16. The method of claim 15, further comprising:
comparing the measured current level on the neutral line to a threshold; and
identifying, when the measured current level on the neutral line exceeds the threshold.

17. The method of claim 11, further comprising identifying the load imbalance based on measured current levels on each load-side branch circuit off of the first and the second phase lines.

18. The method of claim 11, further comprising determining the at least one load based on a corresponding load profile for each load of the at least one load.

19. The method of claim 18, wherein the at least one load is determined based on, for each load in the at least one load, full-load current specified in the corresponding load profile.

20. The method of claim 11, further comprising determining the at least one load based on measured current levels for each load of the plurality of loads.

* * * * *